United States Patent Office 3,024,224
Patented Mar. 6, 1962

---

3,024,224
POLYMERIZATION OF FLUORINE-CONTAINING OLEFINS
Ralph L. Herbst, Westfield, and Billy F. Landrum, Belleville, N.J., assignors, by mesne assignments, to Minnesota Mining and Manufacturing Company, St. Paul, Minn., a corporation of Delaware
No Drawing. Filed Apr. 16, 1954, Ser. No. 423,832
4 Claims. (Cl. 260—87.5)

This invention relates to the polymerization of fluoro-olefins. In one of its aspects this invention relates to a process for controlling the molecular weight of polymers of fluoro-olefins. In one of its more particular aspects this invention relates to the polymerization of trifluorochlorethylene, and more particularly to a process for controlling the molecular weight of normally solid polymers of trifluorochloroethylene.

Solid polymers of fluoro-olefins find application in a wide variety of uses since they can be molded and extruded into articles of manufacture, such as gaskets, tubing, diaphragms, films and coatings of various types. These polymers are stable over a wide range of temperatures and resistant to most corrosive chemical reagents. Homopolymers and copolymers of trifluorochloroethylene are among the most suitable because of the above properties.

Trifluorochloroethylene has been polymerized by a batch type operation in which the monomer and peroxide promoter are maintained in a reaction bomb at a temperature of about −20° C. for a period of about seven days. This operation results in the formation of a porous plug of solid polytrifluorochloroethylene from which occluded monomer is removed by heating under subatmospheric pressure.

A continuous slurry type system can also be employed for the polymerization of trifluorochloroethylene. In this system crude monomer prepared by the dechlorination of trifluorotrichloroethane with zinc in the presence of methanol is purified by water wash and a series of distillations. The purified monomer is then polymerized in the presence of a suitable promoter, such as trichloroacetyl peroxide, to form a slurry of polymer in monomer. The solid polymer is separated from the resultant polymer-in-monomer slurry and dried.

Trifluorochloroethylene has also been polymerized in an aqueous suspension system which includes a persulfate-bisulfite promoting mixture with a small amount of ferrous sulfate added.

Many of the physical characteristics of the plastic polymers are dependent on their molecular weights. In general, the high molecular weight material is harder and tougher and more difficult to fabricate, such as by molding and extrusion. On the other hand, the lower molecular weight materials are softer and more pliable and much easier to fabricate. The use of the plastic materials and the form desired determines what molecular weight plastic can be used. In view of the above, it is much to be desired to provide a method of polymerization to produce desired molecular weight products. The molecular weight of the product, such as a polymer of trifluorochloroethylene, depends upon such factors as the concentration of the promoter, the temperature of polymerization, and the time of polymerization. Thus, if a particular molecular weight plastic is desired for a certain application, it is necessary to adjust one of these factors. Even in a batch type process a change of conditions entails an inconvenient and time consuming operation, but in a continuous system such a change may necessitate a major overhaul of the equipment used. In addition to these general objections to such changes, in the case of the promoter concentration two further objections may be raised. These are the possible introduction of promoter impurities and the well known explosive nature of the peroxide promoters, both of which become appreciable as the concentration of promoter is increased.

The object of this invention is to provide a process for the polymerization of fluorine-containing olefins, particularly perfluorochloro-olefins.

Another object of this invention is to provide a process for controlling the molecular weight of polymers of fluoro-olefins.

Still another object of this invention is to provide modifiers for the polymerization of fluoro-olefins.

A further object of this invention is to provide a simple, inexpensive means for controlling the molecular weight of normally solid polymers and copolymers of trifluorochloroethylene for use in various applications.

Still another object of this invention is to provide a means for producing a lower molecular weight solid polytrifluorochloroethylene.

Other objects and advantages of the present invention will become apparent to those skilled in the art from the accompanying description and disclosure.

In accordance with this invention, the polymerization of fluorine-containing olefins is effected in the presence of a polymerization modifier of the formula,

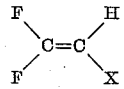

where X is fluorine, chlorine, bromine, or iodine. Between about 0.01 and about 10 mole percent of the above modifier based on monomer is used during polymerization, the exact concentration depending upon the molecular weight of polymer desired. More than one modifier of the above class can be used if a cumulative effect is desired, without departing from the scope of this invention. For example, 1-chloro-2,2-difluoroethylene is about 27 times as effective a chain transfer agent as trifluoroethylene. Because of this disparity in effect of different modifiers, the more effective modifier can be added to the approximate optimum level and a less effective modifier used for more critical control. Concentrations of modifier below the above range are ineffective and concentrations above the range result in loss of effective control by means of the modifier.

These modifiers are believed to act in the capacity of chain transfer agents although such theory is not to be construed as an unnecessary limitation of the invention. The mechanism of chain transfer involves attack by the growing polymer radical upon a hydrogen or halogen of the transfer agent molecule. This terminates the growing polymer chain and prevents further chain propagation by the polymer chain itself. The chain transfer agent then initiates a new chain. It can be seen that the process of chain transfer will result in lower molecular weight polymers.

One of the advantages of this invention is the providing of a means whereby a solid plastic polymer of varying molecular weight may be produced. For some applications a lower molecular weight polymer may be desired because of its relative ease of processability. For another application the highest molecular weight possible may be desirable. By means of this invention it is possible to change a system designed for the production of very high molecular weight product to one which will produce a product of lower molecular weight simply by adding to the polymerization monomer stream a previously determined concentration of modifier of the above type.

This invention applies generally to the polymerization of perhalogenated olefins containing fluorine to produce both solid homopolymers and copolymers. A perhalo olefin is defined as an olefin consisting of carbon and halogen with any degree of unsaturation; preferably according to this invention, the perhalo olefin is a mono-olefin and contains chlorine in addition to fluorine. According to this invention a saturated fluorochloro-carbon is dechlorinated under suitable conditions of dechlorination in the presence of a metallic dehalogenating agent, such as zinc, to produce a perfluorohalo mono-olefin as a monomer for subsequent polymerization. The dechlorination is carried out in the presence of a suitable solvent, such as methanol or ethanol. The crude monomer effluent containing both higher boiling and lower boiling contaminants is removed from the dechlorination reactor and purified. The major contaminants of the crude monomer are the solvent, such as methanol, and perhalocarbons. Accordingly, the crude monomer is water washed to effectively remove substantially all of the methanol or water soluble solvent. After water washing, the water washed monomer is then dried under conditions such that the monomer contains less than about 100 p.p.m., preferably less than 10 p.p.m. of water, and distilled to remove low boiling impurities. After removal of the low boiling impurities the monomer bottoms from the first distillation are subjected to a second distillation to remove the high boiling impurities. Best results are obtained by distillation at pressures above 100 pounds per square inch gage.

The purified monomer is then polymerized in a suitable reaction zone to produce a solid thermoplastic polymer. In general, the temperature of polymerization may be at any level between about −20° C. and about 50° C., preferably between about 0° and about 30° C. A peroxy compound is employed as a promoter for the polymerization. Such a peroxy compound may be either organic or inorganic. However, the halogenated acyl peroxides such as trichloroacetyl peroxide, chloroacetyl peroxide, dichlorofluoroacetyl peroxide and the perfluorochloropropionyl peroxides are preferred. Preferably, the pressure is maintained during polymerization sufficiently high such that the monomer forms a liquid phase in the reaction zone. The conversion of the monomer may vary over a wide range from about 4 percent to about 90 percent. This conversion depends upon the residence time in the reaction zone. Suitable residence times vary from about 5 hours to 50 hours.

The polymer is recovered from the polymerization zone and occluded monomer is removed from the polymer by such conventional methods as evaporation and heating. The polymer is then dried in an oven at elevated temperatures to remove the last traces of monomer. In some instances water washing of the polymer is necessary to remove the last traces of promoting agents.

Since molecular weight determinations for the polymer are difficult and time consuming, the polymers are classified usually by the no-strength-temperature (N.S.T. degrees centigrade) which is proportional to the molecular weight of the product. The N.S.T. values and the method of determination are known in the patent and literature art and those skilled in the art are familiar with this method of grading thermoplastic polymers containing fluorine. In general, the thermoplastic polymers have a minimum N.S.T. of about 220° C. and a maximum of about 350° C. which correspond to a minimum molecular weight of about 50,000 and a maximum molecular weight of about 200,000.

In accordance with the present invention the polymerization is carried out in the presence of a specific and definite amount of the modifier of the above formula to obtain a predetermined molecular weight product (N.S.T. product). It has been found that the N.S.T. of the product may be controlled within plus or minus 3° C. by regulating the concentration of promoter and modifier according to the following equation:

(1) $$\text{NST} = 324 - 277(Y - 0.03) - 202(Y - 0.05)(Z - 0.02) - 2 \times 10^6 \, X^3$$

in which $X$ is the concentration in weight percent of promoter based on monomer, $Y$ is the concentration in mole percent of $CF_2=CHCl$ and $Z$ is the concentration in mole percent of $CF_2=CHF$. The above equation takes into account the cumulative effect of two of the most important modifiers. In some instances it may be desired to use only one modifier and the following equations provide the required concentrations of a single modifier to produce an N.S.T. product within plus or minus 3° C.

(2) $$\text{NST} = 205.6 + \frac{35.66}{Y + 0.29} - 2 \times 10^6 \, X^3$$

(3) $$\text{NST} = 314 - 3.8(Z - 0.02) - 2 \times 10^6 \, X^3$$

The variables in Equations 2 and 3 have the same definitions as the variables in Equation 1. The most convenient method of carrying out the present invention is by introducing the modifier or modifiers in the required predetermined concentration into the monomer feed passed to the polymerization zone. However, the modifiers may be added separately from the feed and separately from each other without departing from the scope of this invention. In a batch type system the modifiers are added initially in the desired concentration without further additions. In continuous operations, continuous additions of monomer are made during the polymerization either with the feed or independent of the feed. Even in the batch system continuous introduction of modifier may be employed during the polymerization.

The present invention is applicable to the homopolymerization of trifluorochloroethylene and to the copolymerization of trifluorochloroethylene with other halogenated fluorine containing olefins having no more hydrogen atoms than the number of carbon atoms. Such copolymerizations include the copolymerization of trifluorochloroethylene with tetrafluoroethylene, perfluoropropene, perfluorobutadiene, vinylidene fluoride, trifluoroethylene, monofluorochloroethylene, monofluorotrichloroethylene and difluorodichloropropene. In the copolymerization it is usually preferred to employ between about 5 and 95 weight percent of comonomer with trifluorochloroethylene. The conditions of polymerization of the copolymers of trifluorochloroethylene are substantially the same as for the homopolymerization of trifluorochloroethylene. The following discussion of the general application of the present invention to the polymerization of trifluorochloroethylene applies substantially to all copolymerization systems with trifluorochloroethylene.

The following examples are included for the purpose of illustrating the method by which this invention may be practiced and are not to be construed as unnecessarily limiting the scope of the invention.

EXAMPLE 1

This example illustrates the effect of varying concentrations of 1-chloro-2,2-difluoroethylene as a modifier upon the yield and N.S.T. of solid polymeric trifluorochloroethylene.

This monomer ($CF_2=CFCl$) feed used contained 0.02 mole percent $CF_2=CHF$ and 0.03 mole percent $CF_2=CHCl$ as determined by mass spectrometer analysis.

The $CF_2=CHCl$ to be added in addition to that present in the feed was prepared by the debromochlorination of $CF_2Br-CHCl_2$ using zinc-methanol and analyzed 99.1 mole percent purity. For the latter examples, $CF_2=CHF$ was prepared from $CF_2Br-CHClF$ in the same manner.

Polymerizations were carried out in sealed glass tubes (200 ml. capacity) agitated by mechanical shaking. The tubes were thoroughly degreased with trichloroethylene and evacuated before charging. Bis-trichloroacetyl peroxide promoter in Freon 11 solution was measured by pipetting and the Freon 11 stripped off under vacuum before charging the monomer. Trifluorochloroethylene was charged liquid phase. The CF$_2$=CHCl was charged as a vapor and its initial concentration in the reaction mixture based on monomer was determined by filling evacuated flasks of known volume and temperature to a precalculated pressure of CF$_2$=CHCl vapor. The amount of trifluorochloroethylene charged was determined by weighing. The amount of polymer formed was determined by a weighing procedure which did not involve any polymer handling. The data obtained are summarized in Table I for a 20 hour polymerization at 5° C. using 0.01 weight percent bis-trichloroacetyl peroxide as the promoter.

Table I

| Mole percent CF$^2$=CHCl added | Percent yield of polymer | N.S.T. of product |
|---|---|---|
| None | 5.3 | 316 |
| 0.05 | 3.7 | 311 |
| 0.1 | 3.8 | 286 |
| 0.2 | 4.6 | 282 |
| 0.3 | 4.3 | 259 |
| 0.5 | 4.0 | 262 |
| 1.0 | 3.8 | 228 |
| 2.0 | 2.5 | 222 |

It can be seen from this example that the N.S.T. of the product depends upon the concentration of CF$_2$=CHCl modifier. The general range of use of this modifier is between about 0.04 and about 2 mole percent based on monomer.

The polymer product obtained is a thermoplastic homopolymer having a first order transition temperature of about 210° C. It is chemically and physically inert and can be fabricated into various articles of manufacture, such as valve diaphragms, gaskets, insulators, etc., by molding at elevated temperatures above the transition temperature. It can be formed into continuous and homogeneous films from dispersions or solutions, or by extrusion, which films serve as excellent protective surfaces. The fabricated polymer is non-porous and water repellant. The use of a modifier improves the embrittlement characteristics of the polymer.

EXAMPLE 2

This example illustrates the effect of promoter concentration upon the yield and N.S.T. of polymeric trifluorochloroethylene using 0.1 mole percent CF$_2$=CHCl as a modifier. In this example, the same procedure was employed as in Example 1, except that 0.1 mole percent CF$_2$=CHCl was added and the promoter concentration varied. The data are summarized in Table II.

Table II

| Weight percent promoter | Percent yield of polymer | N.S.T. of product |
|---|---|---|
| 0.013 | 4.3 | 283 |
| 0.015 | 5.2 | 274 |
| 0.018 | 5.4 | 274 |
| 0.021 | 9.1 | 271 |
| 0.025 | 9.7 | 269 |

The promoter concentration is important in determining yield and has but little effect on the N.S.T. of the polymer, whereas from Example 1 it can be seen that the concentration of modifier is the critical factor in the determination of the N.S.T. of the polymer and has a lesser effect on the yield of polymer.

EXAMPLE 3

This example illustrates the effect of varying concentrations of CF$_2$=CHF is a modifier upon the yield and N.S.T. of polymeric trifluorochloroethylene. This example was carried out the same as Example 1, except the concentration of CF$_2$=CHF is varied. The data obtained are summarized in Table III.

Table III

| Mole percent CF$^2$=CHF added | Percent yield of polymer | N.S.T. of product |
|---|---|---|
| 0.03 | 4.7 | 312 |
| 0.50 | 5.1 | 309 |
| 2.0 | 4.7 | 311 |
| 3.0 | 3.9 | 304 |
| 5.0 | 3.6 | 295 |
| 8.0 | 2.4 | 282 |

It is seen that using a 0.01% promoter concentration, 300 N.S.T. polymer can be produced with as much as about 4 mole percent CF$_2$=CHF present in the monomer charge. The general range of use of this modifier is between about 0.02 and about 8 mole percent based on monomer.

EXAMPLE 4

This example illustrates the effect of promoter concentration upon the yield and N.S.T. of polymeric trifluorochloroethylene using 1.0 mole percent CF$_2$=CHF as a modifier. This example was carried out in accordance with the procedure of Example 1 except that 1.0 mole percent CF$_2$=CHF as a modifier was added to the monomer charge in each run and the promoter concentration varied. The data are summarized in Table IV.

Table IV

| Weight percent promoter | Percent yield of polymer | N.S.T. of product |
|---|---|---|
| 0.010 | 4.4 | 304 |
| 0.013 | 4.8 | 301 |
| 0.015 | 5.0 | 299 |
| 0.018 | 5.6 | 301 |
| 0.021 | 6.0 | 288 |
| 0.025 | 6.9 | 270 |

The data concerning the effect of CF$_2$=CHF as a polymerization modifier shown in Examples 3 and 4 demonstrates the concentrations of this modifier which must be used in order to control the molecular weight (N.S.T.) of the plastic polymer product.

EXAMPLE 5

A preferable method of effecting the result is to use a mixture of two or more modifiers, such as a mixture of CF$_2$=CHCl and CF$_2$=CHF. This example will serve to illustrate this procedure. In this example the polymerization procedure was the same as in Example 1. The promoter concentration is 0.01% and the concentrations of CF$_2$=CHCl and CF$_2$=CHF are both varied. The data obtained are summarized in Table V.

Table V

| Mole percent CF$_2$=CHCl added | Mole percent CF$_2$=CHF added | Percent yield of polymer | N.S.T. of product |
|---|---|---|---|
| 0.03 | 0.02 | 4.7 | 312 |
|  | 0.12 | 4.6 | 312 |
|  | 0.40 | 4.9 | 315 |
|  | 0.80 | 4.3 | 308 |
| 0.06 | 0.12 | 4.0 | 310 |
|  | 0.40 | 4.2 | 306 |
|  | 0.80 | 3.6 | 293 |
| 0.08 | 0.06 | 4.1 | 300 |
|  | 0.12 | 3.9 | 305 |
|  | 0.40 | 3.6 | 301 |
|  | 0.80 | 4.0 | 292 |
| 0.13 | 0.06 | 4.4 | 286 |
|  | 0.12 | 3.5 | 283 |
|  | 0.40 | 3.7 | 275 |
|  | 0.80 | 3.4 | 268 |

In the case of the copolymers, it is generally preferred to use a reaction or feed mixture of fluoro-olefins, at least 20 mole percent of which is trifluorochloroethylene.

The preferred modifiers of this invention are those of the formula $CF_2=CHX$ in which X is a gaseous halogen when used in conjunction with a perhalogenated acyl peroxide in an amount between about 0.01 and about 0.1 weight percent based on monomer.

Various modifications and applications of the present invention will become apparent to those skilled in the art without departing from the scope of this invention.

Having described our invention, we claim:

1. In a process for the polymerization of trifluorochloroethylene monomer using an organic peroxy compound as a promoter at a temperature between about $-20°$ C. and about $50°$ C. to produce a solid high molecular weight polymer, the method for controlling the no-strength-temperature (N.S.T.) of the product which comprises adjusting the concentration of chlorodifluoroethylene in the polymerization feed in an amount between about 0.04 and about 2 mole percent in accordance with the following equation:

$$NST \ °C. = 205.6 + \frac{35.66}{Y+0.29} - 2 \times 10^6 \ X^3$$

in which X is the weight percent of promoter based on monomer and Y is the mole percent chlorodifluoroethylene based on monomer and recovering a homopolymer as the product of the process.

2. In a process for the polymerization of trifluorochloroethylene monomer using a halogenated acyl peroxide as a promoter at a temperature between about $-20°$ C. and about $50°$ C. to produce a solid high molecular weight polymer, the method for controlling the no-strength-temperature (N.S.T.) of the product which comprises adjusting the concentration in the polymerization feed of a mixture of trifluoroethylene and chlorodifluoroethylene in an amount between about 0.02 and about 8 mole percent mixture based on monomer and no more than about 2 mole percent of chlorodifluoroethylene based on monomer in accordance with the following equation:

$$NST \ °C. = 324 - 277(Y-0.03) \\ -202(Y-0.03)(Z-0.02) - 2 \times 10^6 \ X^3$$

in which X is the weight percent promoter based on monomer, Y is the mole percent of chlorodifluoroethylene, and Z is the mole percent of trifluoroethylene and recovering a homoploymer as the product of the process.

3. The process of claim 2 wherein the halogenated acyl peroxide is trichloroacetyl peroxide and is used in concentrations of from about 0.01 to about 0.025 percent based on the weight of trifluorochloroethylene monomer.

4. In a process for the polymerization of trifluorochloroethylene in a polymerization zone at a temperature between about $-20°$ C. and about $50°$ C. in the presence of a peroxy polymerization promoter to produce a solid, high molecular weight polymer, the method for controlling the molecular weight of the product which comprises controllably introducing into the polymerization zone in an amount between about 0.04 and 2 mole percent based on trifluorochloroethylene of $CF_2=CHCl$ as an additive.

References Cited in the file of this patent

UNITED STATES PATENTS

| | | |
|---|---|---|
| 2,456,255 | Coffman | Dec. 14, 1948 |
| 2,479,367 | Joyce | Aug. 16, 1949 |
| 2,631,998 | Pearson | Mar. 17, 1953 |

FOREIGN PATENTS

| | | |
|---|---|---|
| 593,605 | Great Britain | Oct. 21, 1947 |
| 796,026 | France | Jan. 17, 1936 |

OTHER REFERENCES

Schmidt et al.: "Principles of High-Polymer Theory and Practice," 62, 63, McGraw-Hill (1948).